(12) United States Patent
Hanley

(10) Patent No.: US 6,223,972 B1
(45) Date of Patent: May 1, 2001

(54) METHOD AND APPARATUS FOR FORMING METAL FOIL AND SOLDER ASSEMBLED OBJECTS

(76) Inventor: Richard E. Hanley, 4211 Southport Cir., #1-B, Okemos, MI (US) 48864

(*) Notice: Subject to any disclaimer, the term of this patent is extended or adjusted under 35 U.S.C. 154(b) by 0 days.

(21) Appl. No.: 09/358,605

(22) Filed: Jul. 21, 1999

(51) Int. Cl.[7] .......................... B23K 35/02; B23K 31/12
(52) U.S. Cl. ........................................... 228/121; 228/174
(58) Field of Search .................................... 228/121, 134, 228/39, 174, 49.1; 269/41; 428/38

(56) References Cited

U.S. PATENT DOCUMENTS

| | | |
|---|---|---|
| 3,420,728 | 1/1969 | Haverstock . |
| 3,563,835 | 2/1971 | Nussbaum et al. . |
| 3,872,574 | 3/1975 | Worden . |
| 4,009,309 | 2/1977 | Holt . |
| 4,110,393 | 8/1978 | Trame . |
| 4,217,326 | 8/1980 | Goralnik . |
| 4,235,952 * | 11/1980 | Holmes et al. . |
| 4,302,260 | 11/1981 | Meltzer . |
| 4,312,688 | 1/1982 | Brodis et al. . |
| 4,343,758 | 8/1982 | Goralnik . |
| 4,452,839 | 6/1984 | Worden . |
| 4,488,919 * | 12/1984 | Butler . |
| 4,557,772 | 12/1985 | Crist, Jr. . |
| 4,690,852 | 9/1987 | Hull . |
| 5,558,269 * | 9/1996 | Wallace . |
| 5,558,827 * | 9/1996 | Howes . |
| 6,029,882 * | 2/2000 | Bolde et al. . |

* cited by examiner

Primary Examiner—Patrick Ryan
Assistant Examiner—Jonathan Johnson
(74) Attorney, Agent, or Firm—Ian C. McLeod; Mary M. Moyne

(57) ABSTRACT

A method and apparatus for constructing a metal foil and solder assembled object (10), is described. The apparatus includes a final mold (400) having a recessed final pattern (408). The sides (408A) of the final pattern form an obtuse angle with the floor (408B) of the final pattern. To create the object, material pieces (12), rods (14) and accessory pieces (16) are positioned in the final pattern. Prior to positioning the material pieces in the pattern, the edges (12A) of the material pieces are covered by foil (18). Once the material pieces, rods and accessory pieces are in place in the pattern, the pieces and rods are soldered together using conventional soldering techniques. The material pieces are positioned adjacent the sides of the pattern such that when the edges of the pieces are soldered, the solder (20) comes in contact with the sides of the pattern approximately half the distance up the edge of the material pieces. The contact with the sides causes the solder to form a radiused top portion above the point of contact with the sides such that the solder forms an aesthetically pleasing rounded bead around the edges of the material pieces.

6 Claims, 10 Drawing Sheets

METHOD AND APPARATUS FOR FORMING METAL FOIL AND SOLDER ASSEMBLED OBJECTS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION (1) Field of the Invention

The present invention relates to a method and apparatus for forming metal foil and solder assembled objects. In particular, the present invention relates to a method of using a mold to create metal foil and solder assembled objects.

(2) Description of the Related Art

In the past, producing aesthetically pleasing metal foil and solder assembled objects such as stained glass windows or stained glass objects was labor intensive and required a high level of skill. Numerous ways have been suggested to try to reduce the amount of time and skill involved without decreasing the aesthetic quality of the objects produced.

The related art has shown various ways to produce a simulated stained glass or leaded glass object which does not require soldering material pieces together. Illustrative are U.S. Pat. Nos. 3,420,728 to Haverstock; U.S. Pat. No. 3,563,835 to Nussbaum et al; U.S. Pat. No. 4,009,309 to Holt; U.S. Pat. No. 4,110,393 to Trame; U.S. Pat. No. 4,217,326 to Goralnik; U.S. Pat. No. 4,302,260 to Meltzer; U.S. Pat. No. 4,312,688 to Brodis et al; and U.S. Pat. No. 4,343,758 to Goralnik.

Haverstock describes a method for making a window assembly having a colorful display simulating a stained glass window. The method uses a transparent material such as cellophane which is secured to the window by an adhesive which is preferably opaque to simulate the joints in a stained glass window.

Nussbaum et al shows a simulated stained glass which uses a base and a cover to hold the glass pieces together. The cover has mock soldering deposits.

Holt shows a method of constructing a simulated stained glass object by positioning a pre-patterned colored film between two translucent material preforms and applying a leading effect plastics material in channels in the top preform.

Trame shows a method of constructing a simulated stained glass object using resins and vacuum forming molds.

Goralnik '758 and '326 show the use of glass pieces, moldable material and a mold having channels to produce a simulated leaded glass object. The glass pieces are releasably secured on the mold surface such that the edges of glass pieces are adjacent the channels. The channels are filled with a moldable material such as two-part epoxy such that the material fills the channel and the spaces between the adjacent glass pieces. The epoxy material acts as an adhesive to bond the edges of the glass pieces together. A top flange is placed on the upper surface of the glass pieces so as to engage the epoxy resin at the top of the spaces on the upper surface of the glass pieces.

Meltzer shows a method for making simulated stained glass articles using textured plastic joined together by plastic adhesive.

Brodis et al shows a method for applying lead stripping and colored, plastic thin-film stock to a window pane to simulate a stained glass window.

Another method described in the related art involves using a mold or form to construct the leaded glass objects. This is particularly used to construct similar lamp shades. Illustrative are U.S. Pat. Nos. 3,872,574 and 4,452,839 to Worden and U.S. Pat. No. 4,557,772 to Crist, Jr. which show the use of forms having outer surfaces similar in shape to the shade. The glass pieces are placed on the outer surface of the form and secured together on the form using standard leaded glass techniques.

There remains the need for a method and apparatus which allows for quick and easy creation of authentic metal foil and solder assembled objects without requiring great artistic skill.

SUMMARY OF THE INVENTION

The present invention describes a method and apparatus for creating authentic metal foil and solder assembled objects such as stained glass objects. The method uses a mold to enable the user to accurately construct the objects using metal foil and solder techniques. The mold includes a recessed pattern within which the metal foil and solder assembled objects are formed. The sides of the pattern are angled such that when the edges of the material pieces adjacent the sides of the pattern are soldered, the solder beads along the edge due to the angle of the sides and the surface tension of the solder. The final object has the look of a finely crafted metal foil and solder assembled object.

BRIEF DESCRIPTION OF THE DRAWING(S)

FIG. 1 is a top view of the initial mold 100 of the present invention.

FIG. 2 is a cross-sectional view along the line 2—2 of FIG. 1 showing the first center portion 106 and the initial pattern 108 of the initial mold 100.

FIG. 3 is an enlarged view of a portion of FIG. 2 showing the angle $\alpha 0$ between the side 108A of the initial pattern 108 and the first center portion 106 of the initial mold 100.

FIG. 4 is a top view of the first intermediate mold 200 formed from the initial mold 100.

FIG. 5 is a cross-sectional view along the line 5—5 of FIG. 4 showing the second center portion 206 and the first intermediate pattern 208 of the first intermediate mold 200.

FIG. 6 is a top view of the second intermediate mold 300 formed from the first intermediate mold 200.

FIG. 7 is a cross-sectional view along the line 7—7 of FIG. 6 showing the third center portion 306 and the second intermediate pattern 308 of the second intermediate mold 300.

FIG. 8 is a top view of the final mold 400 formed from the second intermediate mold 300.

FIG. 9 is a cross-sectional view along the line 9—9 of FIG. 8 showing the fourth center portion 406 and the final pattern 408 of the final mold 400.

FIG. 10 is a top view of the final mold 400 having the material pieces 12 and the rods 14.

FIG. 11 is a cross-sectional view along the line 11—11 of FIG. 10 showing the foil 18 around the edges 12A of the material pieces 12 and the rod 14 between the edges 12A of the material pieces 12.

FIG. 12 is a cross-sectional view along the line 12—12 of FIG. 10 showing the spacing between the edges 12A of the material pieces 12 and the sides 408A of the final pattern 408.

FIG. 13 is a cross-sectional view along the line 13—13 of FIG. 10 showing the solder 20 along the edges 12A of the material pieces 12.

FIG. 14 is a front view of the finished assembled object 10 having a base 24.

FIG. 15 is a top view of a kit 26 having the material pieces 12, the rods 14, the base 24, the solder 20, the foil 18 and the final mold 400.

DESCRIPTION OF THE PREFERRED EMBODIMENT(S)

Figure 1:
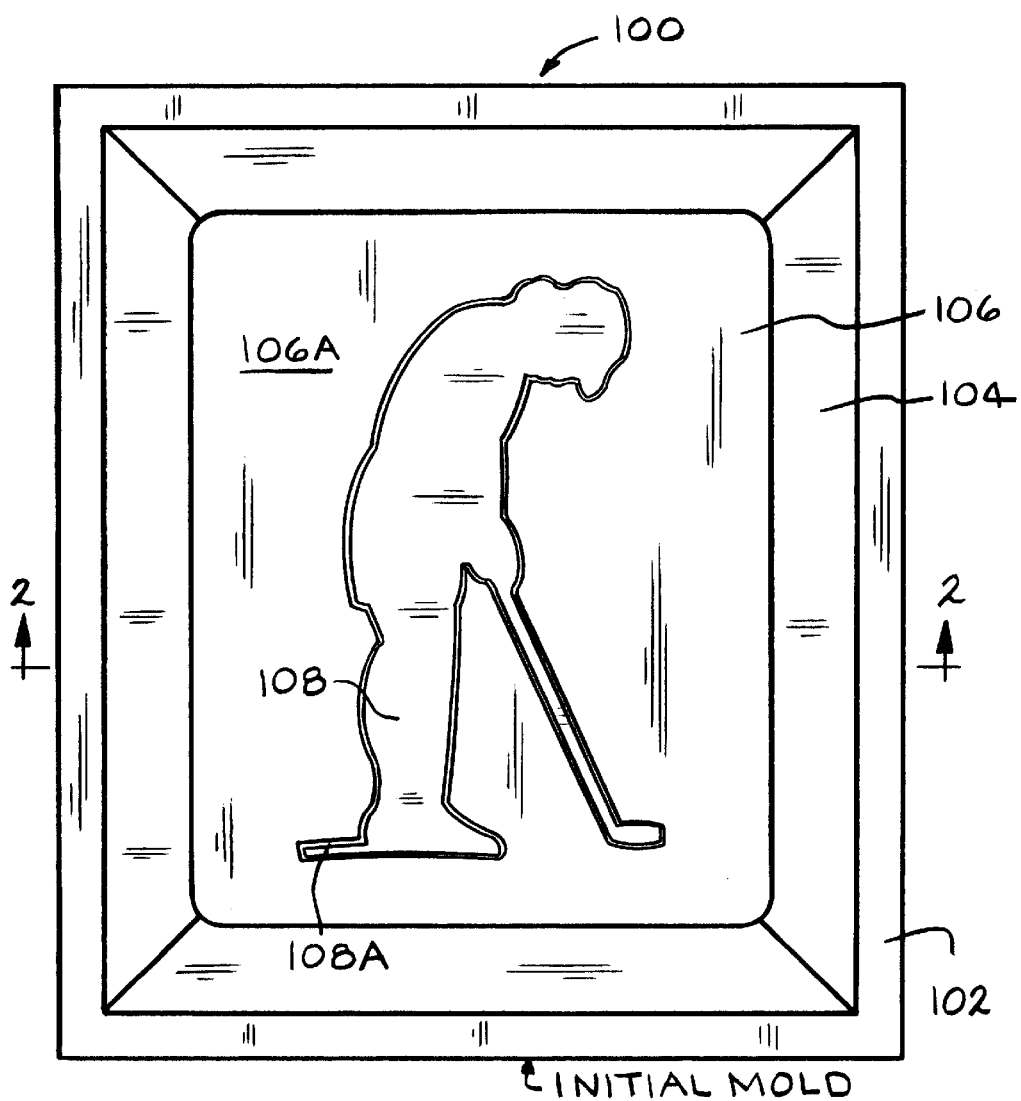

The present invention relates to a mold for making a metal foil and solder assembled object using material pieces and solder, which comprises: a base having a pattern with sides and a floor, the pattern having a shape in an outline of the object, the sides forming an obtuse angle with the floor in a direction away from an inside of the pattern wherein when the material pieces are placed in the inside of the pattern, the material pieces are spaced apart from the sides of the pattern and wherein when the solder is melted between the material pieces and the sides of the pattern, the angle of the sides allows the solder to form a rounded bead on the material pieces adjacent the sides of the pattern due to a surface tension of the solder.

Further, the present invention relates to a kit for producing a metal foil and solder assembled object, which comprises: a mold having a pattern formed by sides and a floor and having a shape in an outline of the object, the sides forming an obtuse angle with the floor in a direction away from an inside of the pattern; material pieces optionally for forming and then for positioning in the pattern of the mold to form first portions of the object; solder for attaching the material pieces together; and foil for covering edges of the material pieces to enable the solder to adhere to the material pieces.

Still further, the present invention relates to a method for producing a metal foil and solder assembled object, which comprises the steps of: providing a mold with a pattern formed by sides and a floor and having a shape in an outline of the object, the sides forming an obtuse angle with the floor in a direction away from an inside of the pattern; providing material pieces for positioning in the pattern of the mold to form first portions of the object; providing solder for attaching the material pieces together; providing foil for covering edges of the material pieces to enable the solder to adhere to the material pieces; wrapping foil around the edges of the material pieces such that the foil extends completely around the edges; positioning the material pieces in the inside of the pattern of the mold; soldering adjacent material pieces together by melting solder between adjacent edges of the material pieces; and soldering the edges of the material pieces adjacent the sides of the pattern of the mold wherein the angle of the sides of the mold allows the solder to form a rounded bead along the edges of the material pieces due to a surface tension of the solder.

Further still, the present invention relates to a method for constructing a mold for use in producing a metal foil and solder assembled object, which comprises the steps of: providing an intermediate mold having a border with a center portion, the center portion having a surface spaced below the border, the surface of the center portion having an intermediate pattern in the shape of the object, the intermediate pattern extending upward into the center portion wherein sides of the intermediate pattern of the intermediate mold form an obtuse angle with the surface of the intermediate mold; and creating a final mold by pouring a liquid material over the intermediate mold such as to fill the center portion of the intermediate mold and cover the intermediate pattern, allowing the material to harden and removing the hardened material from the intermediate mold, the final mold having a center portion with a surface, the surface of the center portion having a final pattern in the shape of the object, the final pattern extending downward into the center portion, wherein sides of the final pattern of the final mold form an obtuse angle with a floor of the final pattern.

Still further, the present invention relates to a method for constructing a final mold for use in producing a metal foil and solder assembled object, which comprises the steps of: providing a first intermediate mold having a first border with a first center portion, the first center portion having a first surface spaced below the first border, the first surface of the center portion having a first pattern in the shape of the object, the first pattern extending downward into the center portion; creating a second intermediate mold by pouring a first liquid material over the first intermediate mold such as to cover the border, the first center portion and the first pattern, allowing the first material to harden and removing the hardened material from the first intermediate mold, the second intermediate mold having a second border with a second center portion having a second surface spaced below the second border, the second surface of the second center portion having a second pattern in the shape of the object, the second pattern extending upward into the center portion wherein sides of the second pattern of the second mold form an obtuse angle with the second surface; and creating the final mold by pouring a second liquid material over the second intermediate mold such as to fill the second center portion and cover the second pattern, allowing the second material to harden and removing the hardened material from the second intermediate mold, the final mold having a center portion with a surface, the surface of the center portion having a final pattern in the shape of the object, the final pattern extending downward into the center portion, wherein sides of the final pattern form an acute angle with the surface of the center portion.

Further, the present invention relates to a method for constructing a mold for use in producing a metal foil and solder assembled object, which comprises the steps of: providing an initial mold having a border with a center portion, the center portion having a surface spaced below the border, the surface of the center portion having a first pattern in the shape of the object, the first pattern extending upward into the center portion; creating a first intermediate mold by pouring a first liquid material over the initial mold such as to cover the border, the center portion and the first pattern, allowing the first liquid material to harden and removing the hardened material from the initial mold, the first intermediate mold having a border with a center portion having a surface spaced above the border, the surface of the center portion having a first intermediate pattern in the shape of the object, the first intermediate pattern extending downward into the center portion; creating a second intermediate mold by pouring a second liquid material over the first intermediate mold such as to cover the border, the center portion and the first intermediate pattern, allowing the second liquid material to harden and removing the hardened material from the second intermediate mold, the second intermediate mold having a border with a center portion having a surface spaced below the border, the surface of the center portion having a second intermediate pattern in the shape of the object, the second intermediate pattern extending upward into the center portion, wherein sides of the second intermediate pattern of the second intermediate mold form an obtuse angle with the surface of the second intermediate mold; and creating a final mold by pouring a third liquid material over the second intermediate mold such as to cover the border, the center portion and the second intermediate pattern, allowing the third liquid material to harden and removing the hardened material from the second intermediate mold, the final mold having a center portion with a surface, the surface of the center portion having a final pattern in the shape of the object, the final pattern extending downward into the center portion wherein sides of the final pattern form an obtuse angle with a floor of the final mold.

Finally, the present invention relates to a method for constructing a final mold for use in producing a metal foil and solder assembled object, which comprises the steps of: creating a drawing having an outline of the object; creating an initial mold having a border surrounding a center portion, the center portion having a surface spaced below the border with an initial pattern which is created using the drawing wherein the initial pattern extends upward from the surface into the center portion; creating a first intermediate mold by pouring a first liquid material over the initial mold such as to cover the border, the center portion and the initial pattern, allowing the first liquid material to harden and removing the hardened material from the initial mold, the first intermediate mold having a border with a center portion, the center portion having a surface spaced above the border, the surface having a first intermediate pattern in the shape of the object, the first intermediate pattern extending downward into the center portion; creating a second intermediate mold by pouring a second liquid material over the first intermediate mold such as to cover the border, the center portion and the first intermediate pattern, allowing the second liquid material to harden and removing the hardened material from the first intermediate mold, the second intermediate mold having a border with a center portion, the center portion having a surface spaced below the border, the surface of the center portion having a second intermediate pattern in the shape of the object, the second intermediate pattern extending upward into the center portion; and creating the final mold by pouring a third liquid material over the second intermediate mold such as to cover the border, the center portion and the second intermediate pattern, allowing the third liquid material to harden and removing the hardened material from the second intermediate mold, the final mold having a center portion with a surface, the surface of the center portion having a final pattern in the shape of the object, the final pattern extending downward into the center portion, wherein sides of the final pattern form an obtuse angle with a floor of the final pattern.

Figure 14:
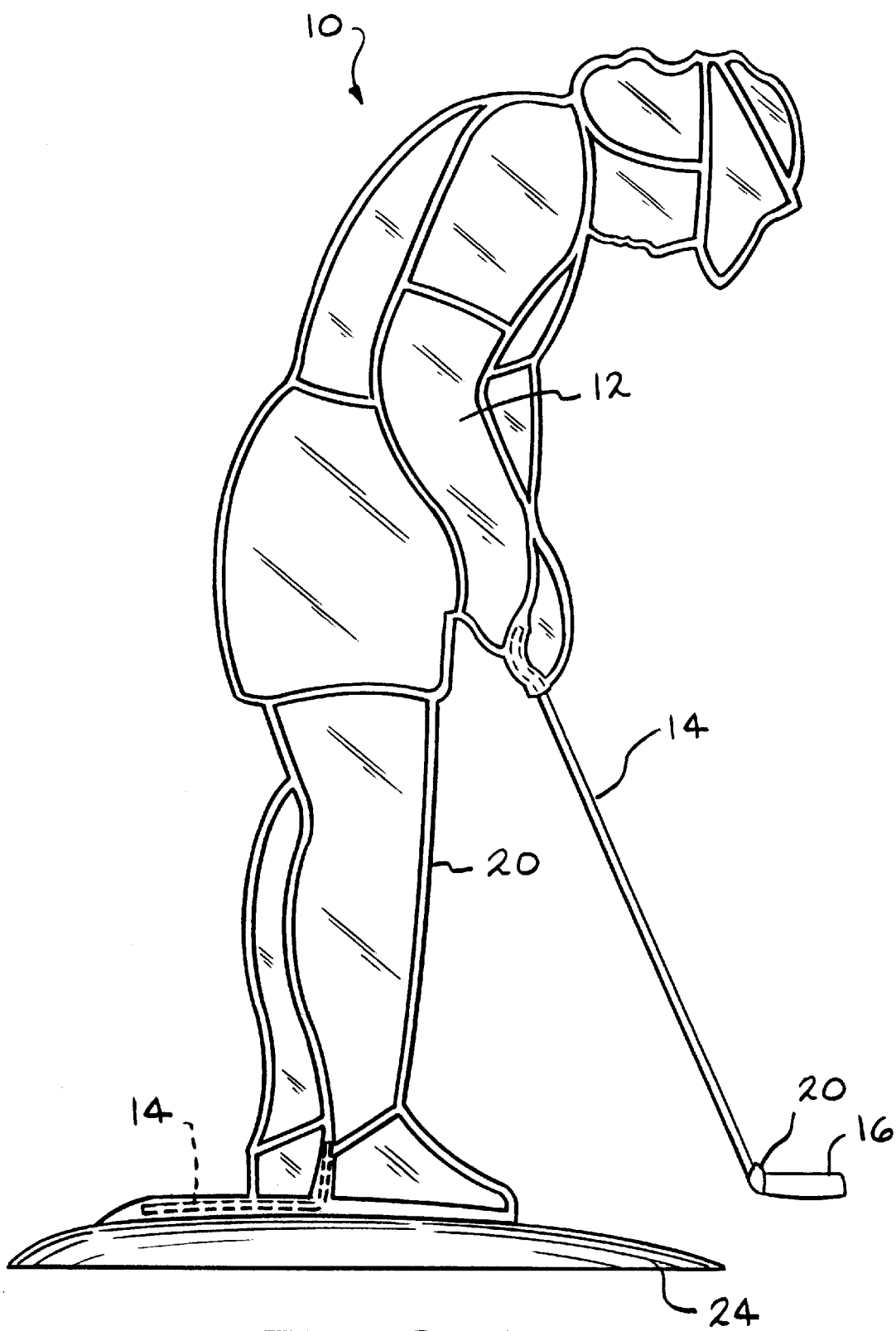

FIG. 14 shows the metal foil and solder assembled object 10 created using the present invention. In the first embodiment of the present invention, an initial, first intermediate and second intermediate mold (100, 200 and 300) are used to create a final mold 400. The final mold 400 is then used to create the metal foil and solder assembled object 10. The final mold 400 allows a user (not shown) to create an authentic metal foil and solder assembled object 10 such as a stained glass object while minimizing the amount of time, effort and skill involved in producing the object 10.

Figure 3:
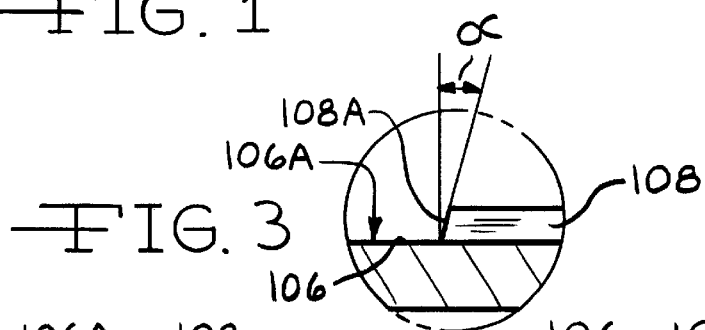
Figure 2:
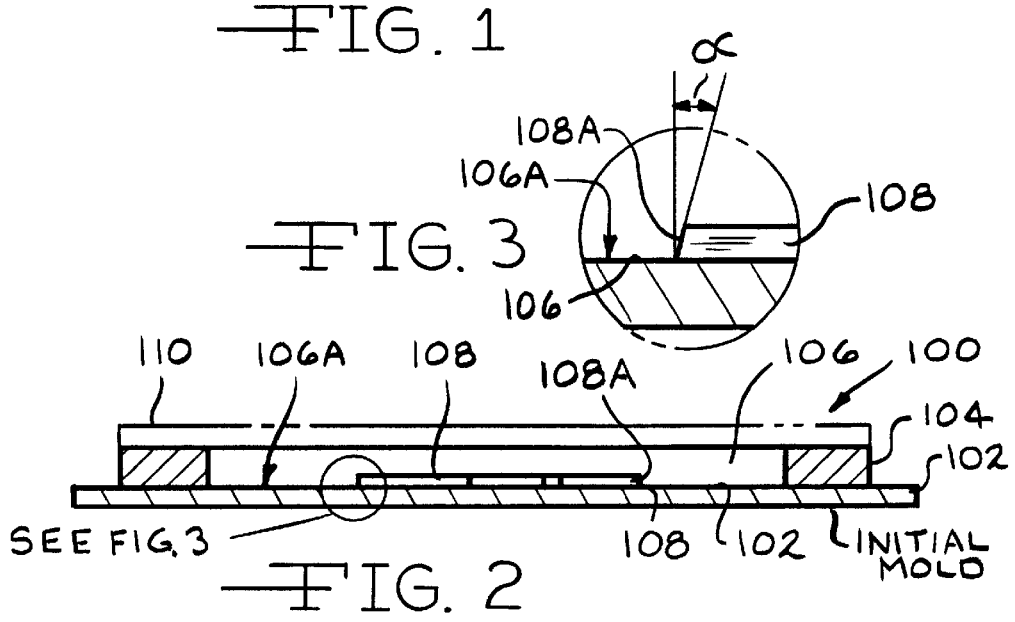

To create the fourth or final mold 400, the initial, first intermediate and second intermediate molds (100, 200 and 300) are first constructed. The initial mold 100 has a flat base 102 with a raised border 104 around the perimeter of the base 102 slightly spaced apart from the edge of the base 102 and forming a first center portion 106 (FIGS. 1 and 2). The center portion 106 has a floor or first surface 106A formed by the base 102. A raised initial pattern 108 is mounted or positioned on the floor 106A of the center portion 106. The initial pattern 108 has an outer perimeter in the shape of the object 10 such as to be a positive image of the object 10. The sides 108A of the initial pattern 108 form an obtuse angle with the floor 106A of the center portion 106 (FIG. 3). In the first embodiment, the angle $\alpha 0$ between a vertical line perpendicular to the floor 106A of the center portion 106 and the line forming the side 108A of the initial pattern 108 is between 4° and 15° (FIG. 3). Preferably, the top edges of the sides 108A have a corner at the top. In an alternate embodiment (not shown), the top edges of the sides 108A of the initial pattern 108 opposite the floor 106A are radiused. In the first embodiment, the base 102 and initial pattern 108 of the mold 100 are constructed of separate styrene pieces and the border 104 is constructed of aluminum. However, the base 102, pattern 108 and border 104 could be constructed of a variety of different materials. In addition, the base 102 and initial pattern 108 could be constructed as a unitary piece with the initial pattern 108 cut out of the base 102. In another alternate embodiment (not shown), the initial mold 100 is created using a base 102 with a layered material on the base 102. The layered material is cut in the shape of the object 10 such as to form the initial pattern 108 and any excess material is removed. The border 104 is then mounted on the base 102 around the initial pattern 108. In this embodiment, the base 102 is constructed of acrylic having a thickness of between about 0.125 to 0.25 inches (0.318 to 0.64 cm). The layered material is preferably sandblast rubber masking having a thickness of 0.050 inches (0.127 cm) per layer. Preferably, two (2) layers are used to form the initial pattern 108. The layers are preferably cut using a knife such as an X-ACTO® knife. In this embodiment, to create the pattern 108, a drawing (not shown) of the shape of the object 10 is prepared on vellum with a pencil. The drawing is then placed on the layer of the sandblast rubber masking and the vellum is rubbed to transfer the pencil drawing to the layer. In all embodiment, the initial pattern 108 preferably extends upward from the floor 106A of the center portion 106 about 0.100 inches (0.254 cm).

Figure 4:
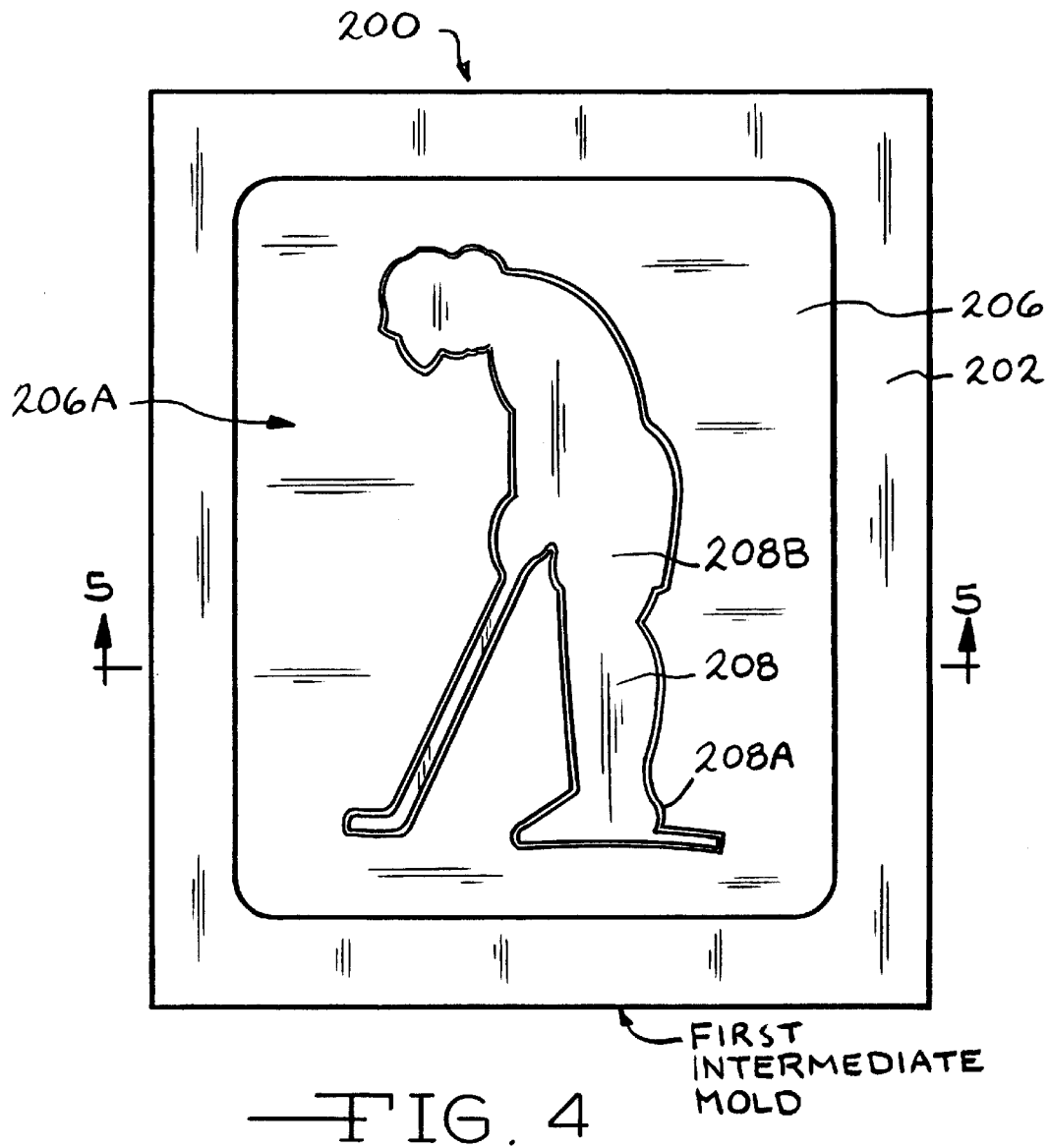
Figure 5:
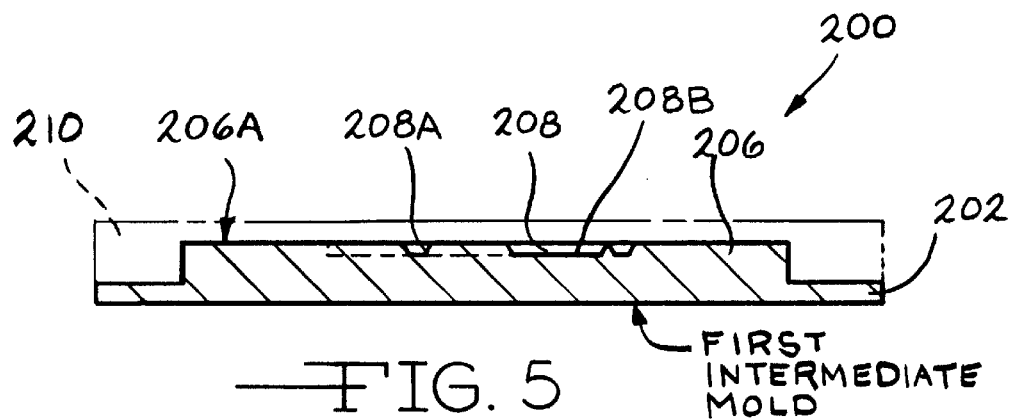

A first intermediate mold 200 is formed using the initial mold 100. The first intermediate mold 200 is essentially opposite from the initial mold 100 (FIGS. 4 and 5). The first intermediate mold 200 includes a base 202 having a raised center portion 206 having a top surface 206A. A recessed first intermediate pattern 208 is located in the top surface 206A of the raised center portion 206. The first intermediate pattern 208 is preferably positioned in the center of the raised center portion 206. The first intermediate pattern 208 has a shape about its outer perimeter opposite to the shape of the object 10 such as to be a negative image of the object 10.

Similarly to the initial mold 100, the sides 208A of the first intermediate pattern 208 form an obtuse angle with a floor 208B of the first intermediate pattern 208 (FIG. 5). The angle $\alpha$ of the sides 208A of the first intermediate pattern 208 is identical to the angle $\alpha$ of the sides 108A for the initial pattern 108. To create the first intermediate pattern 208, a first liquid material 110 is poured over the initial mold 100 such as to cover the border 104, the first center portion 106 and the initial pattern 108 (FIG. 2). A frame (not shown) is placed around the perimeter of the base 102 between the edges of the base 102 and the border 104. The frame prevents the first liquid material 110 from extending beyond the border 104 and the initial mold 100. The first liquid material 110 is then allowed to cure or harden (FIG. 2). Once the material 110 is hard, the material 110 is removed from the initial mold 100 and the first intermediate mold 200 is formed. In the first embodiment, the first liquid material 110 is a hard urethane. However, it is understood that a variety of different types of materials can be used. In the first embodiment, the first intermediate mold 200 is exactly opposite from the initial mold 100 such that the first intermediate pattern 208 has a depth of about 0.100 inches (0.254 cm). The bottom edges of the first intermediate pattern 208 adjacent the floor 208B of the center portion 206 are preferably sharp. However, the bottom edges of the pattern 208 could be radiused if the top edges of the sides 108A of the initial pattern 108 of the initial mold 100 are radiused. The first intermediate mold 200 can also be created without using an initial mold 100. The first intermediate mold 200 can be created directly by milling a single block of material such as a hard urethane block (not shown). The material can be milled using any well known method such as by using a CAD router controlled by a computer program.

Figure 6:
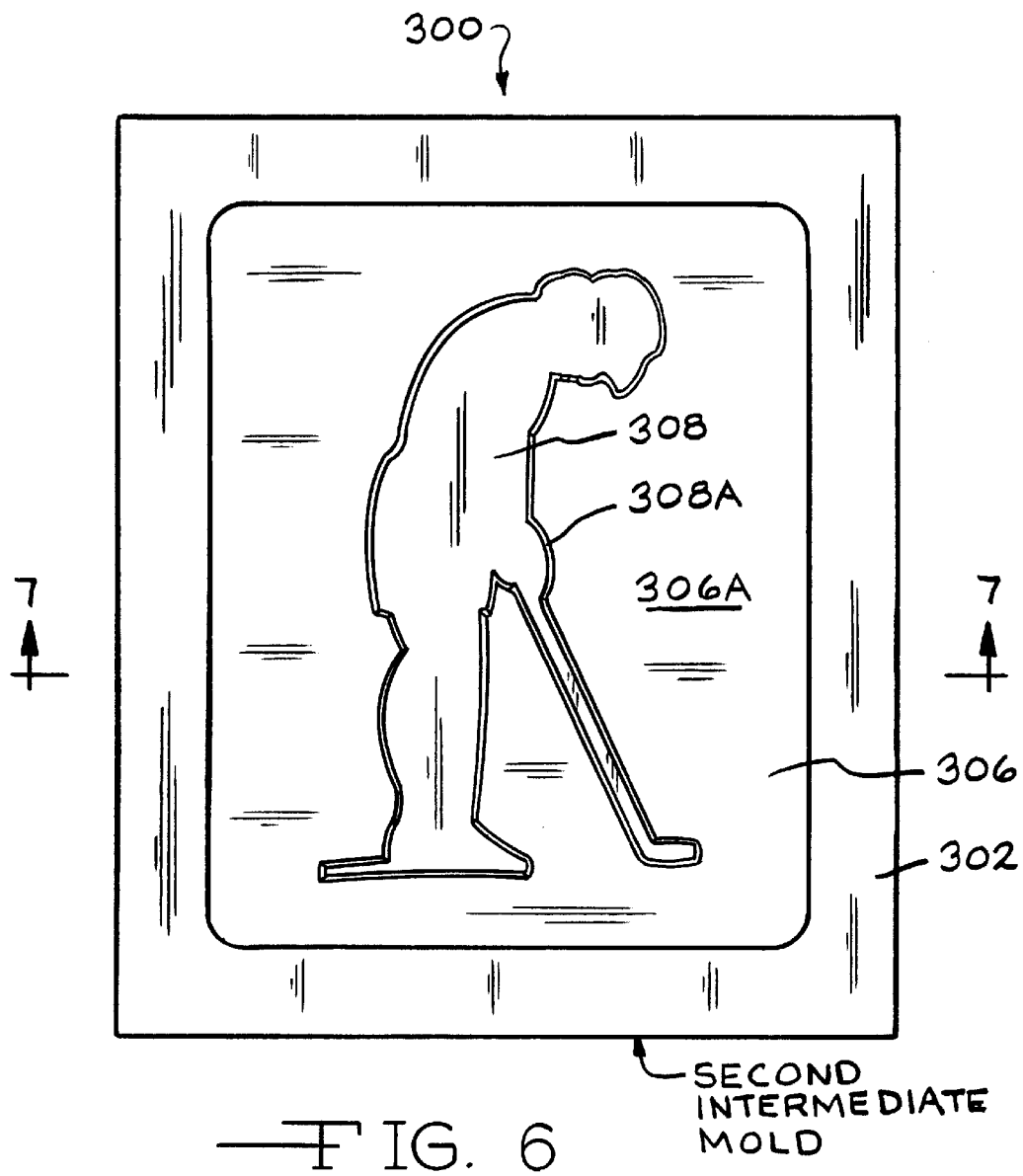
Figure 7:
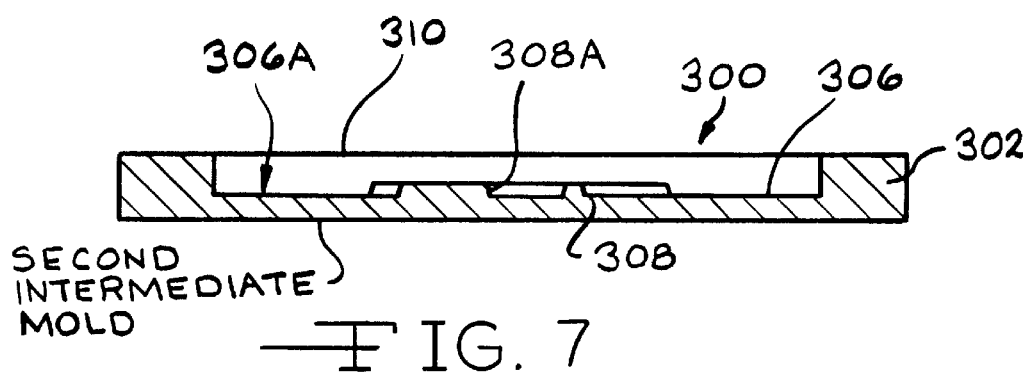

The first intermediate mold 200 is used to form the second intermediate mold 300 (FIGS. 6 and 7). The second intermediate mold 300 preferably includes a base 302 having a recessed center portion 306 with a second intermediate pattern 308 extending upward from the floor 306A of the center portion 306. The second intermediate pattern 308 has a perimeter shape similar to the shape of the object 10 such as to be a positive image of the object 10. The sides 308A of the second intermediate pattern 308 are angled similarly to the sides 108A and 208A of the initial and first intermediate patterns 108 and 208. In addition, as with the initial pattern 108, the top edges of the sides 308A of the second intermediate pattern 308 can be rounded or radiused or sharp depending on the shape of the top edges of the sides 108A of the initial mold 100. To create the second intermediate mold 300, a second liquid material 210 is poured over the first intermediate mold 200 (FIG. 5). The liquid material 210 is poured such as to cover the base 202, the center portion 206 and the first intermediate pattern 208 (FIG. 5). A frame (not shown) is positioned around the edges of the base 202 such as to prevent the second liquid material 210 from extending beyond the edges of the base 202. The second liquid material 210 is preferably a polyurethane rubber material which remains flexible after curing or hardening. The second material 210 is allowed to harden and is then removed from the first intermediate mold 200. In the first embodiment, the second intermediate pattern 308 extends upward from the floor 306A of the center portion 306 a distance of about 0.100 inches (0.254 cm).

Figure 8:
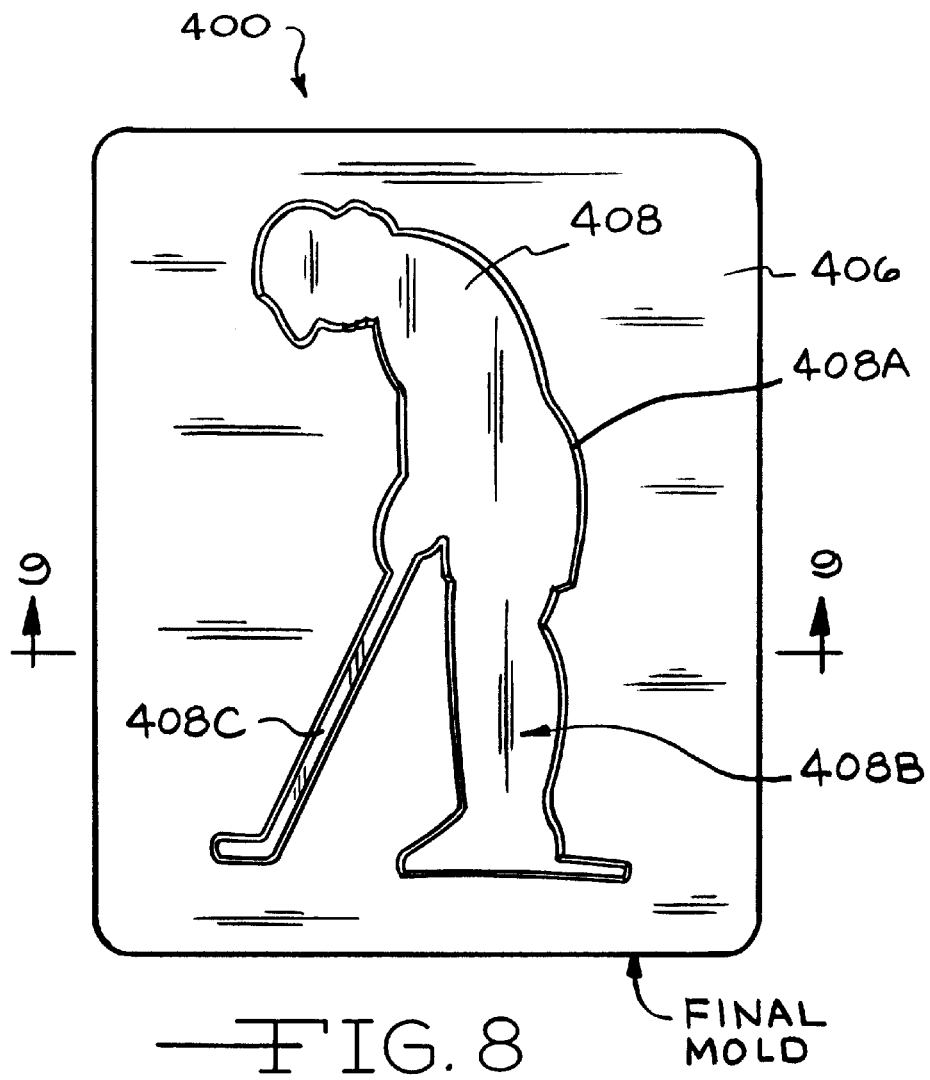
Figure 9:
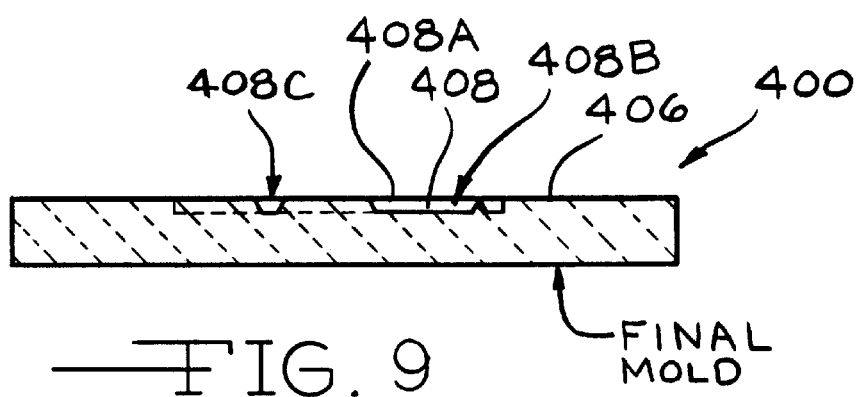

The final mold 400 is created using the second intermediate mold 300 (FIG. 8). The final mold 400 includes a final center portion 406 with a recessed final pattern 408 (FIG. 9). The final pattern 408 has an outer perimeter shape similar but opposite to the shape of the object 10 such as to be a negative image of the object 10. In the first embodiment, the final mold 400 has a single final pattern 408 having the shape of the object 10. In an alternate embodiment (not shown), the pattern has several separate sections with each section forming a portion of the object 10. The sections in the mold 400 would not be connected and would not be soldered together. The sections would form separate pieces which taken together form the complete object 10. The sections would be mounted to a base 24 to form the final completed object 10. As with the previous patterns 108, 208 and 308, the sides 408A of the final pattern 408 are angled such as to form an obtuse angle with the floor 408B of the final pattern 408. The angle of the sides 408A of the final pattern 408 of the final mold 400 with respect to the floor 408B of the final pattern 408 are preferably between the range of 94° and 105°. To create the final mold 400, a third liquid material 310 is poured over the second intermediate mold 300 such as to cover the center portion 306 and the second intermediate pattern 308 (FIG. 7). Since the center portion 306 of the mold 300 is recessed, a frame does not need to be used with the second intermediate mold 300 when creating the final mold 400. In the first embodiment, the third liquid material 310 is a ceramic or plastic material which is heat resistant and hard when dry or cured. The third material 310 could be gypsum ($CaSO_4$), cement, porcelain, ceramic, clay, feldspar or silica. Reinforcing material such as fiberglass mesh or metal mesh or rods can be added to the third liquid material 310 to prevent the final mold 400 from cracking during the soldering process. The final mold 400 is constructed of a material such that the final mold 400 is not damaged during forming of the metal foil and solder assembled object 10 to enable the final mold 400 to be reused. The third material 310 is allowed to harden and is then removed from the second intermediate mold 300. The flexible nature of the second intermediate mold 300 allows for the easy removal of the final mold 400 from the center portion 306 of the second intermediate mold 300 by twisting or flexing the second intermediate mold 300. The final mold 400 could be constructed directly without using the initial, first intermediate or second intermediate molds (100, 200 or 300). The final pattern 408 of the final mold 400 could be cut or milled directly into a solid piece of material using any well known method. The depth of the final pattern 408 is about 0.100 inches (0.254 cm). The depth of the final pattern 408 is preferably dependent on the thickness of the material pieces 12 used in assembling the object 10. However, preferably the depth of the final pattern 408 is less than 0.160 inches (0.406 cm) when using material pieces 12 having a thickness of 0.25 inches (0.64 cm).

Once the final mold 400 is created, the final mold 400 can be used to create the metal foil and solder assembled object 10. The metal foil and solder assembled object 10 is preferably constructed using material pieces 12, rods 14 and accessory pieces 16 which are positioned in various portions of the recessed final pattern 408 of the final mold 400 and are held together using solder 20. The material pieces 12 used in the object 10 are preferably flat on at least one side such as to lie flat in the final pattern 408. The material pieces 12 are provided in a variety of shapes and sizes depending on the shape of the object 10. The material pieces 12 can be constructed of a variety of different materials. Usually, the material pieces 12 are glass. However, any type of heat resistant material pieces 12 can be used. Some alternate materials include ceramic tile, plastics, cast resins, stone, wood and shell.

Figure 12:
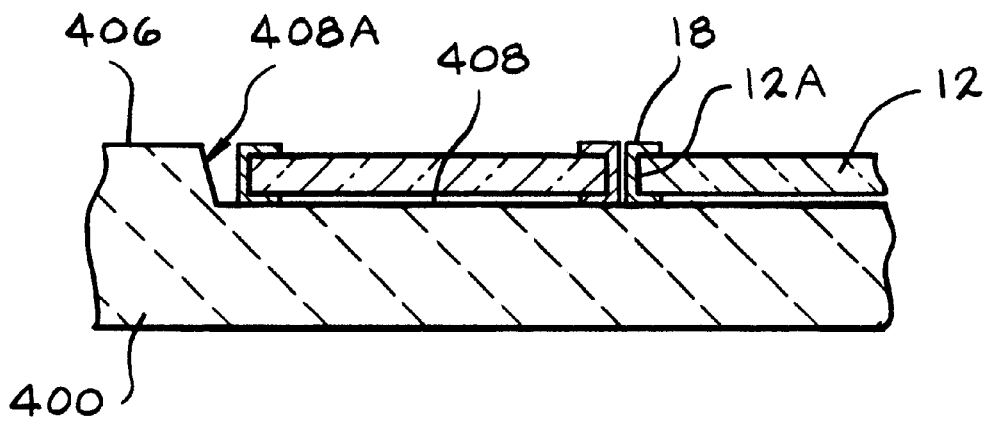
Figure 15:
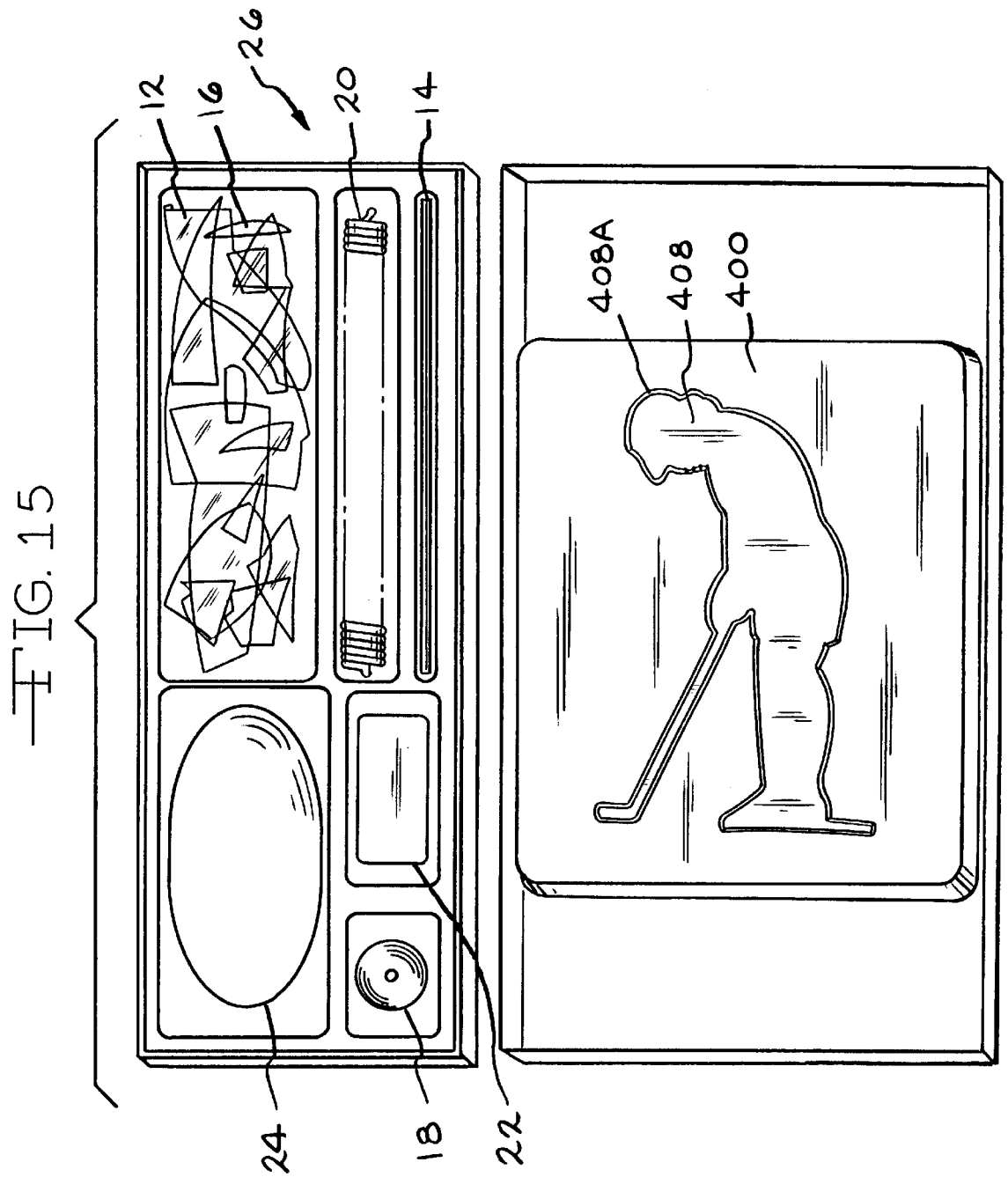

In a first embodiment, a kit 26 is provided which contains the final mold 400, the material pieces 12, the rods 14, if any, the accessory pieces 16, if any, foil 18, solder 20 and a base 24 (FIG. 15). In the first embodiment, the material pieces 12 are precut to fit within the final pattern 408. If the material pieces 12 are not precut, the user needs to select and cut material pieces 12 as necessary to fill the final pattern 408 of the final mold 400. Prior to placement of the material pieces 12 in the final pattern 408 of the final mold 400, the edges 12A of the pieces 12 are covered with foil 18 (FIG. 12). The use of foil 18 to cover edges 12A of material pieces 12 when soldering a metal foil and solder assembled object 10 is well known. The foil 18 allows the solder 20 to adhere to the material pieces 12 and allows the pieces 12 to be secured together. The foil 18 is preferably constructed of copper. However, the foil 18 could also be constructed of other metals such as brass or gold. Foil such as described in U.S. Pat. No. 4,690,852 can also be used to allow for easier alignment of the glass pieces prior to soldering. Prior to positioning the material pieces 12 in the final pattern 408, the foil 18 adjacent the bottom surface of the material pieces 12 is tinned. In the first embodiment, only the bottom surface of the material pieces 12 which is adjacent the floor 408B of the pattern 408 is tinned. This encourages the solder 20 to flow beneath the material pieces 12 during soldering which increases the continuity of the beads of solder 20 formed along the edges 12A of the material pieces 12. The material pieces 12 with the foiled edges 12A are positioned in the final pattern 408 of the final mold 400. The material pieces 12 are preferably positioned in the final pattern 408 such that the edges 12A of the material pieces 12 are spaced at least between about 0.0625 inches and 0.125 inches (0.1588 cm and 0.318 cm) from the sides 408A of the final pattern 408. The edges 12A of the adjacent material pieces 12 can be touching (FIG. 12). However, the distance between the edges 12A of adjacent material pieces 12 can also be spaced a variety of different distances to allow for more solder 20 to be deposited between the material pieces 12 for aesthetic reasons.

Figure 10:
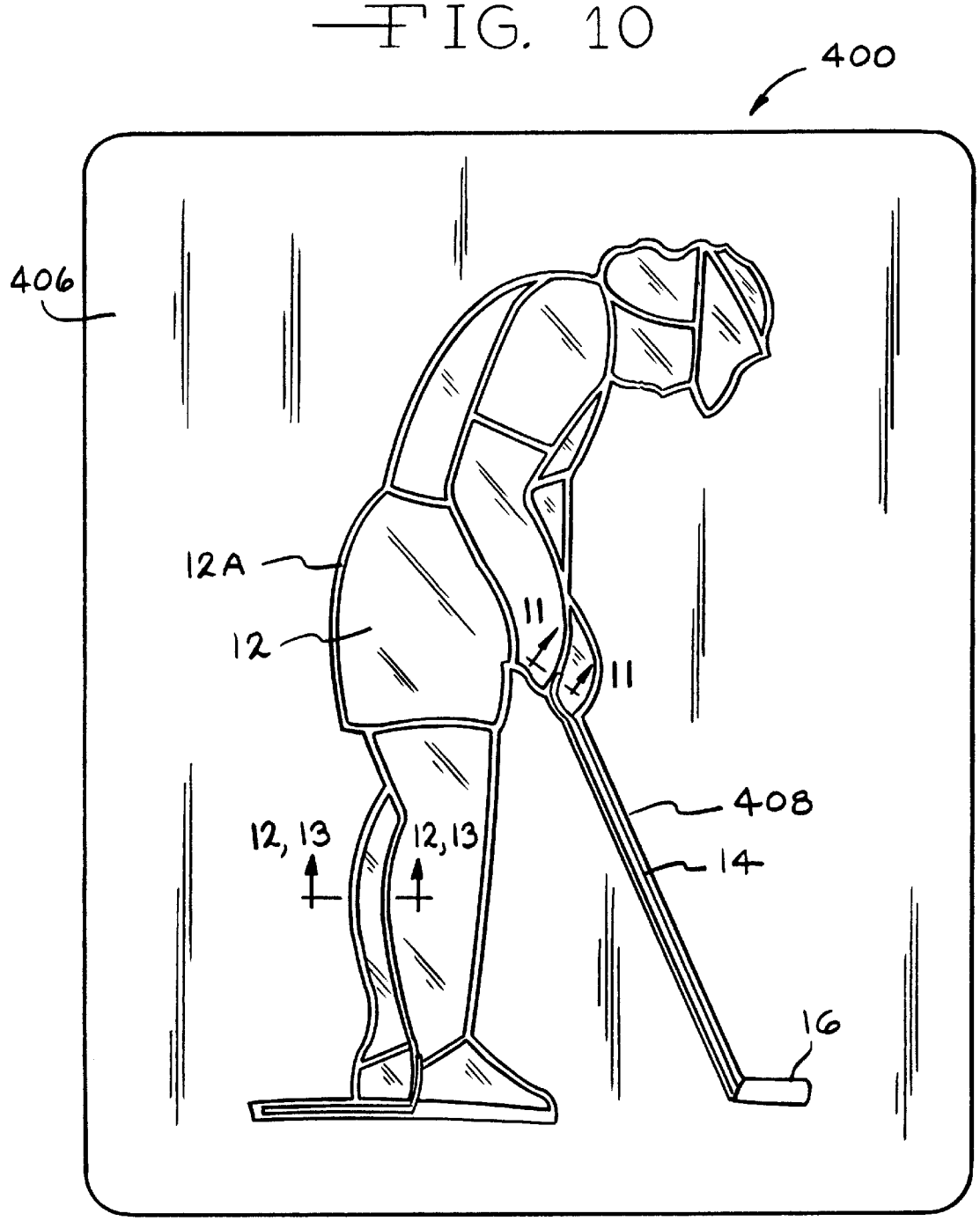
Figure 11:
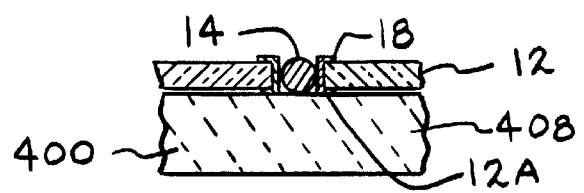

Rods 14 may also be used in the final pattern 408 to form a portion of the object 10. The rods 14 are preferably positioned in channels 408C of the final pattern 408 which are unable to accommodate a material piece 12 (FIG. 11). The rods 14 are preferably used for aesthetically pleasing reasons such as when the object 10 has a narrow section such as the handle of a golf club (FIG. 10). The rods 14 are also used to provide extra support or strength to the object 10. In the first embodiment, a rod 14 is positioned adjacent the base 24 of the object 10 and bent upward into the object 10 between two material pieces 12 such as to provide additional support to the object 10 in the upright position (FIG. 10). To secure the rod 14, the rod 14 is positioned between the edges 12A of the adjacent material pieces 12 and soldered in place. The rod 14 is positioned such that the rod 14 is in contact with the foil 18 along both edges 12A of the material pieces 12. In the first embodiment, the rods 14 have a diameter of about 0.0625 inch (0.1588 cm). Prior to placement of the rods 14 in the final pattern 408, the rods 14 can be tinned such that the rods 14 have a color similar to the soldered sections of the object 10. The rods 14 can be solid rods or hollow tubing. The rods 14 are preferably constructed of brass, copper or coated steel.

In an alternate embodiment (not shown), the channels 408C can be filled with solder 20 from folder connectors. The solder 20 can be used to connect material pieces 12, rods 14 or accessory pieces 16 or any combination thereof together. In the first embodiment, the rod 14 is used for the handle of the golf club and can be replaced by a solder connector. The solder connector would connect the accessory piece 16 used to form the club of the golf club to the material piece 12 forming the golfer's hand. When the metal foil and solder assembled object 10 is removed from the final mold 400, the solder connectors have the strength to hold the material pieces 12, rods 14 or accessory pieces 16 together and in place.

In addition to the material pieces 12 and the rods 14, accessory pieces 16 are used at any place in the mold 100 as wanted by the user for aesthetic reasons. The accessory pieces 16 can be of any shape or size. In the first embodiment, an accessory piece 16 is used to form the club of the golf club (FIG. 10). The accessory pieces 16 can be made of a variety of materials. However, preferably the accessory pieces 16 are constructed of a material which can be easily soldered such as copper. Similarly to the rods 14, the accessory pieces 16 can be tinned prior to placement in the final pattern 408 such that the accessory pieces 16 have a color similar to the color of the soldered sections of the object 10. The kit 26 can also be provided with flux 22 to allow cleaning the rods 14 or the foil 18 around the edges 12A of the material pieces 12 prior to tinning or soldering. The flux 22 is preferably constructed of zinc chloride. Cleaning the foil 18 and the rods 14 with flux 22 eliminates oxidation of the rods 14 and the foil 18 to allow for better adhesion of the solder 20 to the foil 18 and rods 14.

Figure 13:
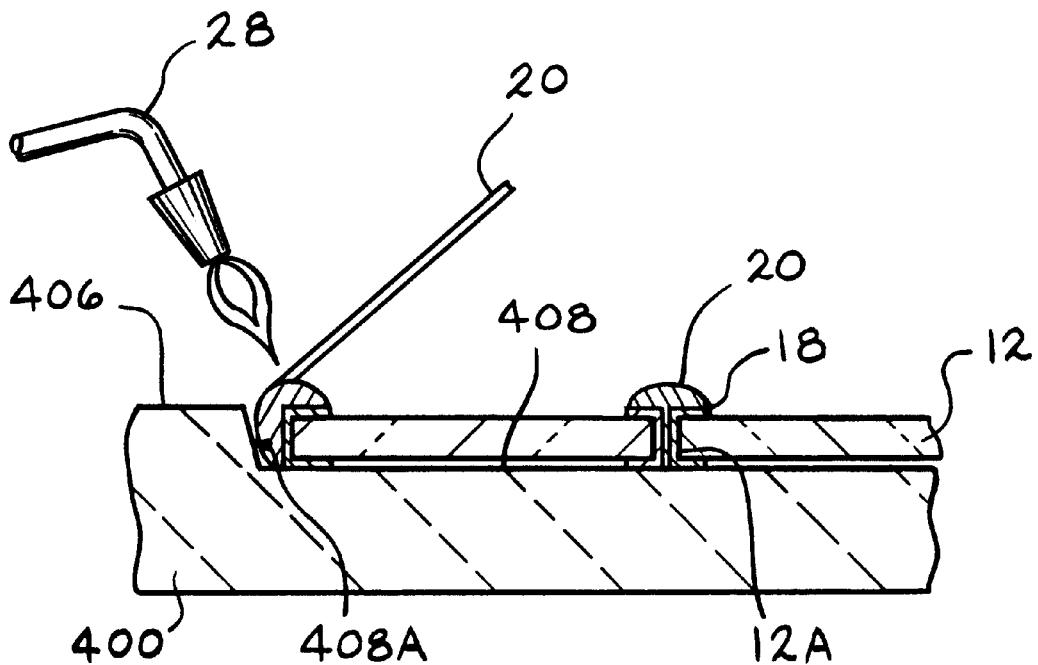

Once the material pieces 12, rods 14 and accessory pieces 16 are in place in the final mold 400, the pieces 12 and rods 14 are soldered together. Prior to soldering, the foil 18 on the top surface of the edges 12A of material pieces 12 is provided with flux 22. Only the top edges of the material pieces 12 are provided with flux 22 to reduce the amount of time necessary to prepare the pieces 12 for soldering. However, in an alternate embodiment, all the foil 18, except for the bottom portions, are provided with flux 22. The solder 20 is flowed inbetween the material pieces 12 and around edges 12A of the material pieces 12, rods 14 and accessory pieces 16 using a hot iron 28 or torch (FIG. 13). Preferably, the iron 28 has a temperature of about 361° to 376° C. If the metal foil and solder assembled object 10 is jewelry, the temperature should be such as can be used with precious metals. The material pieces 12, rods 14 and accessory pieces 16 are preferably soldered and secured together using standard soldering techniques to create metal foil and solder assembled objects 10. The solder 20 is preferably constructed of 60% tin and 40% lead (60/40) solder and is similar to solder well known in the art. However, other types of solder such as 50% tin and 50% lead (50/50) solder can also be used. In addition, if the metal foil and solder assembled object 10 is jewelry, silver solder can be used. The pieces 12 are soldered along all their edges 12A including the edges 12A adjacent the sides 408A of the final pattern 408. The angled shape of the sides 408A of the pattern 408 allow the solder 20 to form a precise, rounded bead along the edge 12A of the material pieces 12. The surface tension of the solder 20 holds the solder 20 in a rounded or radiused position. The spacing of the sides 408A of the final pattern 408 from the edges 12A of the material pieces 12, the angle of the sides 408A, the height of the material pieces 12, the height of the sides 408A of the pattern 408, the surface tension of the solder 20 on the foil 18 and the repellent properties of the final mold 400, all act together to form a precise, rounded bead of solder 20 along the edges 12A of the material pieces 12. Preferably, the angle of the sides 408A of the pattern 408 and the height of the material pieces 12 along the edges 12A are such that at the midpoint along the edges 12A of the material pieces 12, the solder 20 will form its thickest portion having a rounded outer surface and the sides 408A of the pattern 408 will come in contact with the outermost point or radius of the solder 20. The height of the sides 408A or depth of the pattern 408 is at least slightly greater than the midpoint of the edges 12A of the material pieces 12 such that the sides 408A can make contact with the solder 20 at the midpoint of the edges 12A. The lower portion of the soldered bead below the half way point will follow the shape of the lower portion of the side 408A of the final pattern 408. The upper portion of the soldered bead above the midpoint will radius upward and over onto the foil 18 on the top surface 206A of the material pieces 12. This radiusing of the solder 20 is a natural occurrence caused by the surface tension of the solder 20. In an alternate embodiment (not shown), the sides 408A of the final pattern 408 are provided with an inward projection which creates the correct distance between the sides 408A of the pattern 408 and the edges 12A such as to enable the solder 20 to create a radiused edge. If the distance between the sides 408A and the edges 12A at the midpoint is too small, the solder 20 will be unable to form the radiused outer surface and will form along the sides 408A of the final pattern 408 and the final soldered bead will have the shape of the sides 408A of the pattern 408. If the distance between the sides 408A and the edges 12A of the material pieces 12 is too great, the solder 20 will not form a uniform bead around the edges 12A. It is believed that the angled sides 408A of the pattern 408 tend to encourage the surface tension in the solder 20 to hold the solder 20 together to form the radiused bead along the edges 12A. The obtusely angled sides 408A of the pattern 408 also allow for easier removal of the finished object 10.

In the first embodiment, the material pieces 12 are soldered together at the edges 12A such that the solder 20 extends along the edges 12A of the pieces 12 and up on top of the pieces 12 such as to cover the foil 18. Preferably, the solder 20 does not extend beyond the foil 18. In the first embodiment, about 0.02 lbs to 0.03 lbs per linear foot of solder 20 is used to form the bead along the edges 12A of the material pieces 12. The rods 14 and accessory pieces 16 are also soldered and secured in place. The rods 14 are soldered inbetween the material pieces 12 to secure the rods 14 in place. The accessory pieces 16 are soldered at the connection of the accessory pieces 16 to the material pieces 12 or the rods 14. In addition to using the solder 20 to secure the material pieces 12, rods 14 and accessory pieces 16 together, the solder 20 can also be used alone in portions of the final pattern 408 of the final mold 400 to form solid solder areas which are aesthetically pleasing. Further, the final pattern 408 can be provided with complex channels (not shown) in which the solder 20 can be formed to produce a filigree configuration extending out from the material pieces 12.

Once the material pieces 12, rods 14 and accessory pieces 16 have been secured together, the object 10 is removed from the final mold 400. To remove the object 10, the final mold 400 is turned upside down. The side of the object 10 formed opposite the floor 408B of the final pattern 408 of the final mold 400 generally forms the front side of the object 10. However, in an alternate embodiment (not shown), the floor 408B of the final pattern 408 is provided with ornamentation which produces surface ornamentation in the solder 20. This is used particularly where large sections of solder 20 are used to form sections of the object 10. The object 10 can then be treated to give all the metal of the object 10 including the solder 20, tinned rods 14 and tinned accessory pieces 16 a specific patina or plating. Finally, a base 24 is soldered onto the object 10 to enable the object 10 to stand in an upright position. The base 24 can be constructed of a variety of different materials which are able to be soldered. In the first embodiment, for aesthetic reasons, the base 24 is constructed of copper. If desired, the top surface of the base 24 can be tinned before connecting to the object 10. Once the entire piece is constructed, the piece can be cleaned or left as is and lacquered to maintain the finish.

Figure 16:
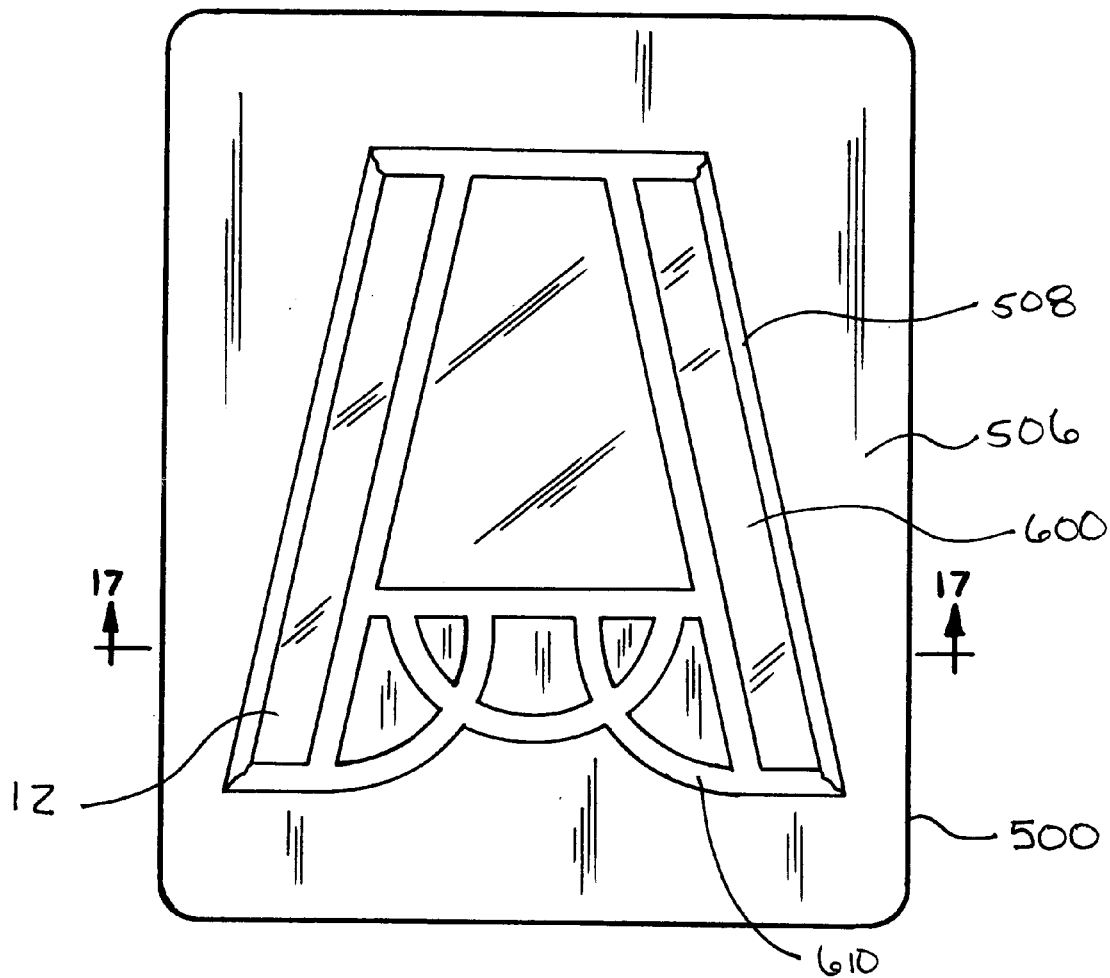
FIG. 16 is a top view of the final mold 500 of the second embodiment.
Figure 17:
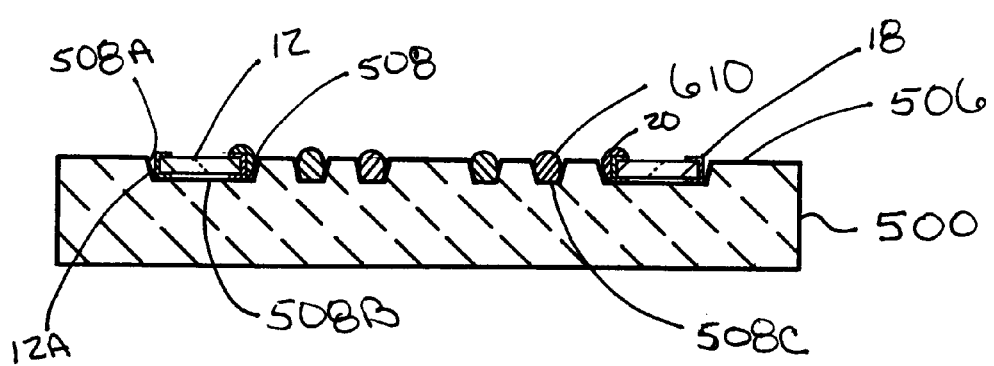
FIG. 17 is a cross-sectional view along the line 17—17 of FIG. 16 showing the angled sides 508A of the final pattern 508 of the second embodiment.
Figure 18:
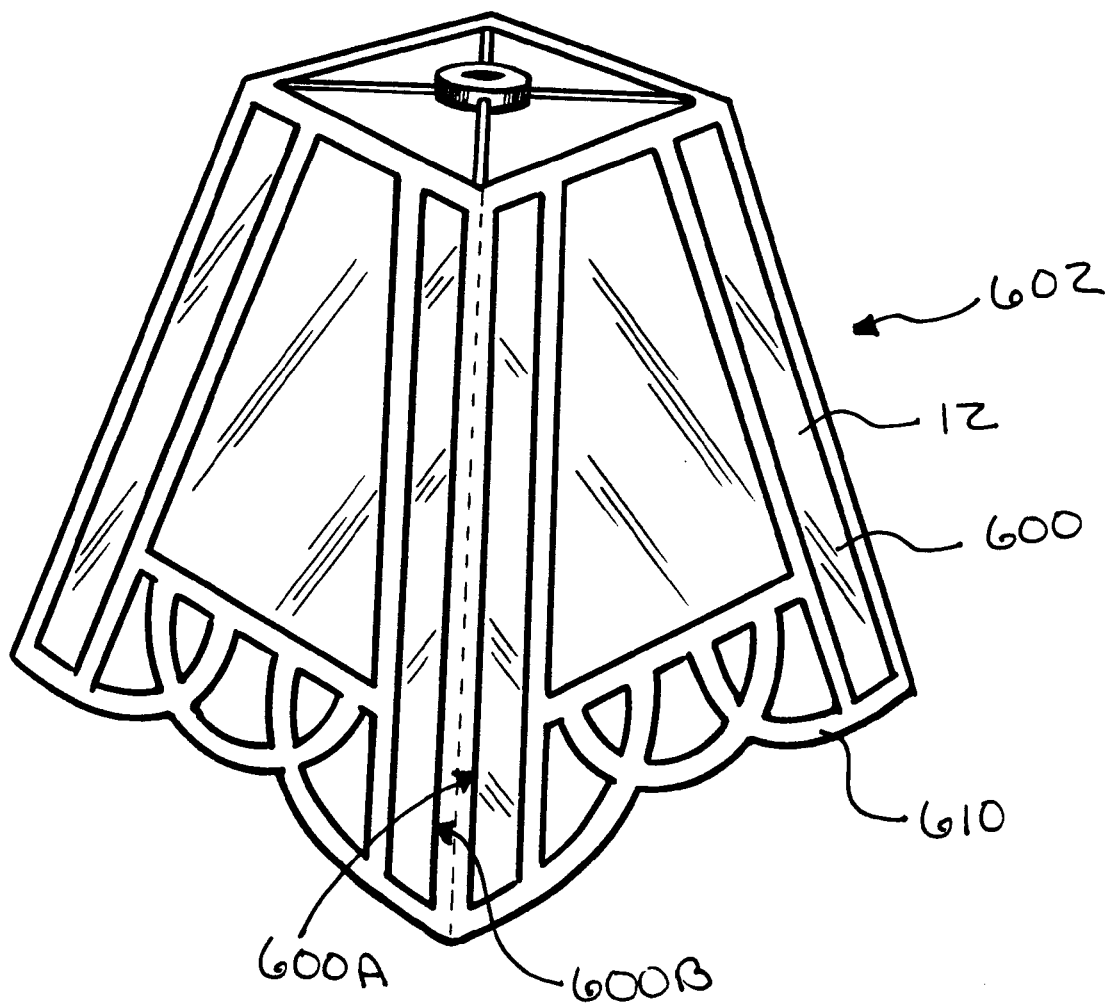
FIG. 18 is a perspective view of a metal foil and solder assembled object 602 formed by the partial metal foil and solder assembled object 600.

In a second embodiment, a partial metal and foil solder assembled object 600 produced by a final mold 500 is used as a portion of a larger metal foil and solder assembled object 602 (FIGS. 16 and 18). In a second embodiment, the final mold 500 can be formed similarly to the final mold 400 of the first embodiment (FIGS. 16 and 17). The final mold 500 of the second embodiment includes a center portion 506 with a recessed final pattern 508 having channels 508C. The perimeter of the final pattern 508 has a shape similar to the shape of the partial metal foil and solder assembled object 600.

As with the first embodiment, the sides 508A of the final pattern 508 including the sides 508A of the channels 508C are angled such as to form an obtuse angle with the floor 508B of the final pattern 508. In the second embodiment, the partial metal foil and solder assembled object 600 contains three (3) material pieces 12 within the recessed final pattern 508. In both embodiments, any numbers and shapes of material pieces 12 can be placed in the recessed final pattern 408 or 508 of the final mold 400 and 500. To produce the partial metal foil and solder assembled object 600, the edges 12A of the material pieces 12 are covered by foil 18. Prior to positioning the material pieces 12 in the final mold 500, the bottom surface of the foil 18 is tinned. The material pieces 12 are then positioned in the final pattern 508 and the edges 12A of the material pieces 12 are then soldered. Where the edges 12A of two (2) material pieces 12 are adjacent, the edges 12A are soldered together to hold the material pieces 12 together. In the second embodiment, the edges 12A of the material pieces 12 along the left and right sides of the partial metal foil and solder assembled object 600 are not provided with solder 20 (FIG. 17). The angled sides 508A of the final pattern 508 allow the solder 20 to form a precise, rounded bead along the edges 12A of the material pieces 12. The use of the final mold 500 allows for a precise and uniform bead of solder 20 around the edges 12A of the material pieces 12. The same final mold 500 is then used to create each of the partial metal foil and solder assembled objects 600 used to form the metal foil and solder assembled object 602. The partial metal foil and solder assembled objects 600 created by the same final mold 500 are preferably identical. In particular, the beads of solder 20 along the edges 12A of the material pieces 12 of the partial metal foil and solder assembled objects 600 are all uniform and precise and essentially identical in height and width.

Once all of the partial metal foil and solder assembled objects 600 have been created, the partial metal foil and solder assembled objects 600 are connected together using solder 20. In the second embodiment, four (4) partial metal foil and solder assembled objects 600 are used to form the metal foil and solder assembled objects 602. To form the metal foil and solder assembled objects 602, the partial metal foil and solder assembled objects 600 are positioned at right angles to each other such that the right side 602B of one partial metal foil and solder assembled object 600 is adjacent to the left side 600A of the adjacent partial metal foil and solder assembled object 600 (FIG. 18). Preferably, the left and right sides 600A and 600B are identical. When the metal foil and solder assembled object 602 is complete, all sides 600A and 600B of the partial metal foil and solder assembled object 600 are in contact with the sides 600A and 600B of an adjacent partial metal foil and solder assembled object 600. Once the adjacent partial metal foil and solder assembled objects 600 are positioned together, the groove formed by the adjacent sides 600A and 600B of the adjacent partial metal foil and solder assembled objects 600 are filled with solder 20. The groove is first filled with solder 20 and then the back side of the groove is lined with solder 20. The channels 508C of the center portion are also filled with solder 20 to form solder connectors 610. The channels 508C are completely filled with solder 20 such that solder 20 extends between the material pieces 12 at each end of the channel 508C and connects the material pieces 12 together and such that the solder 20 extends above the center portion 506. Due to the construction of the mold 500 and the surface tension of the solder 20, the top of the solder 20 is radiused. When the partial metal foil and solder assembled object 600 is removed from the mold 500, the solder connectors 610 will form a filigree pattern with open spaces between the solder connectors 610. In the second embodiment, the larger metal foil and solder assembled object 602 is a lamp shade (FIG. 18).

In a third embodiment (not shown), the objects are secured to metal fixtures and mounted on a window frame. The objects are preferably formed similarly to the objects 10 of the first embodiments. The metal fixtures are preferably constructed of any tubing, wire or bar having a solderable surface. In the preferred embodiment, the metal fixtures have an ornate design and are configured to be mounted in a corner of a window frame. Small metal plates are preferably welded or soldered to the metal fixture. The small metal plates allow for securing the fixture to the window frame. The objects are mounted at various locations on the metal fixture. The objects are preferably attached to the metal fixture by soldering. The objects can be secured to the metal fixture by fine soldering wire to hold the objects in place on the metal fixture to allow easier soldering. Once the objects have been securely soldered to the metal object, the entire assembly can be plated such that all metal surfaces including the solder has a similar patina. The assembly can be plated using bright brass, nickel or copper.

It is intended that the foregoing description be only illustrative of the present invention and that the present invention be limited only by the hereinafter appended claims.

I claim:

1. A heat resistant mold for making a metal foil and solder assembled object using material pieces having edges with a solderable foil around at least some of the edges of each of the material pieces and solder, which comprises:

a base having a pattern with sides and a floor, the pattern having a shape in an outline of the object, the sides forming an obtuse angle with the floor in a direction away from an inside of the pattern, wherein in use of the mold, the material pieces having the solderable foil are placed in the inside of the pattern, the material pieces are spaced apart from the sides of the pattern and each other and wherein as the solder is melted between the material pieces onto the foil and the sides of the pattern, due to a surface tension of the molten solder and the obtuse angle of the sides of the pattern, the solder on the foil on the edges of the material pieces adjacent the sides of the pattern forms a rounded bead which is open to the air.

2. The mold of claim 1 wherein the angle of the sides is between about 94° and 105° from the floor of the pattern.

3. The mold of claim 1 wherein the material pieces are constructed of glass.

4. The mold of claim 1 wherein the pattern has a depth of about 0.100 inches (0.254 cm).

5. The mold of claim 1 wherein the mold is constructed of a ceramic.

6. The mold of claim 1 wherein the pattern has channels with sides, the sides of the channels form an obtuse angle with the floor in a direction away from the inside of the pattern and wherein the channels are filled with solder to form solder connectors extending between the material pieces.

* * * * *